March 29, 1927. 1,622,465
B. G. PARSONS
BRAKE
Original Filed Feb. 18, 1925 2 Sheets-Sheet 1

INVENTOR
BEN G. PARSONS
BY
Jn. W. McConkey
ATTORNEY

March 29, 1927.
B. G. PARSONS
BRAKE
Original Filed Feb. 18, 1925   2 Sheets-Sheet 2
1,622,465
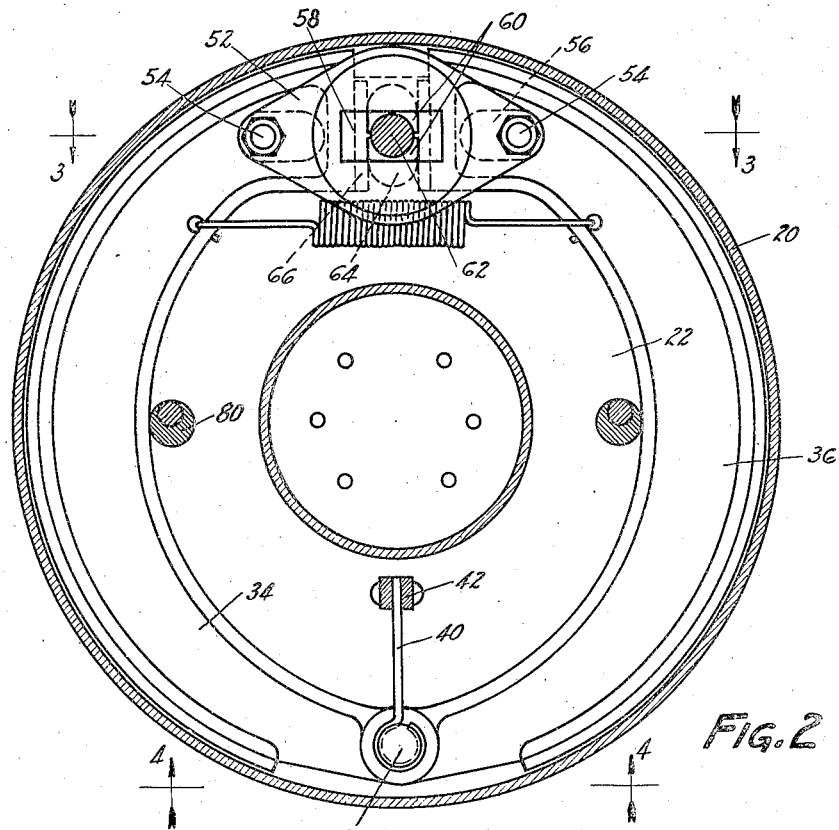
FIG.2
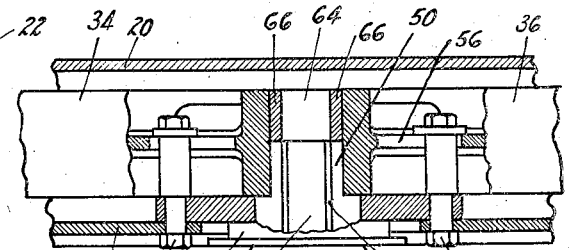
FIG.3
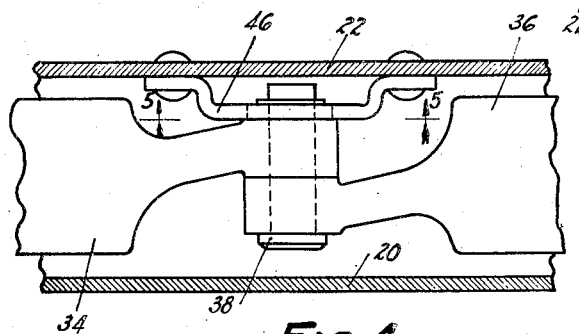
FIG.5
FIG.4
INVENTOR
BEN G. PARSONS
BY
M. W. McConkey
ATTORNEY Patented Mar. 29, 1927.

1,622,465

UNITED STATES PATENT OFFICE.

BEN G. PARSONS, OF DETROIT, MICHIGAN, ASSIGNOR TO THE BENDIX BRAKE COMPANY.

BRAKE.

Application filed February 18, 1925, Serial No. 10,018. Renewed January 10, 1927.

This invention relates to brakes, and is illustrated as embodied in an automobile chassis, one of the front wheel brakes being shown in the drawings. An object of the invention is to provide a brake, preferably of the type in which one segmental shoe is moved frictionally by the drum to operate one or more other shoes, with means for relieving the brake-applying connections from the braking torque.

One important feature of the invention relates to operating a brake of this character, more especially on a swivelled wheel, through a universal joint having the double function of permitting the swivelling of the wheel, and of permitting the brake-applying device to shift, to center itself.

Other features of the invention relate to a novel support for the pivotal connection between the shoes permitting transverse movement but preventing radial movement of the connection, and to other novel combinations and desirable particular constructions illustrated in the accompanying drawings, in which:

Figure 2 is a section on the line 2—2 of Figure 1, showing the shoes in side elevation;

Figure 3 is a horizontal section on the line 3—3 of Figure 2, showing the camshaft mounting;

Figure 4 is a horizontal section generally on the line 4—4 of Figure 2, but showing a modified construction of support for the pivotal connection;

Figure 5 is a detail vertical section on the line 5—5 of Figure 4;

Figure 6 is a front elevation of the bracket forming part of the camshaft mounting;

Figure 7 is a side elevation of the bracket;

Figure 8 is a side elevation of the cam and camshaft and the two shoes forming the slidable camshaft bearing; and Figures 9 and 10 are respectively side and end elevations of one of said shoes forming the slidable camshaft bearing.

Figure 1:
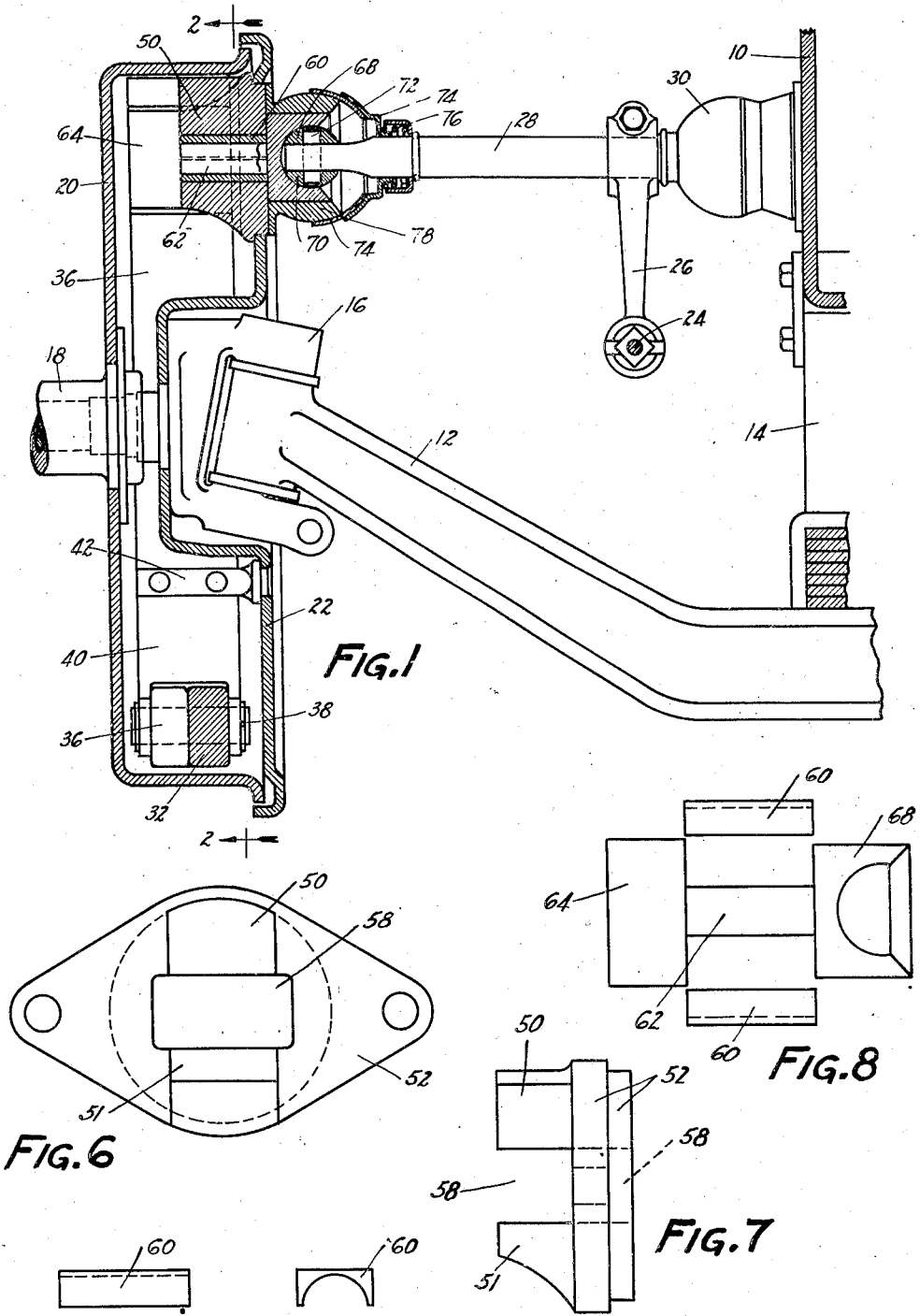
Figure 1 is a vertical transverse section through one front wheel brake.

In the arrangement selected for illustration, the chassis includes a frame 10, supported on a front axle 12 and a rear axle (not shown) by suitable springs 14. On each end of the front axle is swivelled, by means of a king pin, a knuckle 16, on which is rotatably mounted a wheel, the hub of one being shown at 18. Each wheel carries a drum 20, and the knuckle carries a backing plate 22. The brakes are operated from a brake pedal or the like, by means of connections including links 24 rocking arms 26 on shafts 28, the inner ends of which are slidably and universally supported by universal joints 30 on the frame 10.

The brake itself includes a plurality of floating segmental shoes 34 and 36, having a pivotal connection 38. In the arrangement of Figures 1–3, the pivotal connection 38 is supported by a swinging member, preferably a novel leaf spring 40 supported by being riveted between the arms of a forked projection 42 secured to the backing plate 22. In the arrangement of Figures 4 and 5 the connection 38 extends through a slot 44 arranged along a chord of the drum and formed in a bracket 46 secured to the backing plate 22. In either case, the connection 38 may approach the drum when the connected shoes move in either direction circumferentially of the drum, yet is restrained from direct movement radially of the drum, thus permitting closer control of the position of the shoes and guarding against any tendency to "grab".

Between the ends of the connected shoes is a fixed abutment 50—51 forming part of a bracket 52 secured to the backing plate 22 by bolts 54 extending through relatively large openings 56 in the shoes 35 and 36. This abutment takes the braking torque, whichever direction the shoes are shifted by the friction of the drum. The abutment is forked to form upper and lower arms 50 and 51 (see Figures 1, 5, 6, and 7), and the bracket 52 is formed with a corresponding horizontal slot 58, slidably to receive a pair of shoes 60 forming a shiftable journal bearing for a camshaft 62 carrying the cam 64. Cam 64 is arranged at the end of the abutment, between the ends of the connected shoes, or hardened wear-plates 66 secured to the ends of the shoes. The shaft 62 is formed with a head 68 having a cross bore for a cylindrical connecting member 70 which is forked to embrace the flattened end of shaft 28, to which it is secured by a pin 72. The universal joint thus formed is substantially in the steering axis of the wheel, and is enclosed by sheet metal parts 74 held by a spring 76 in sliding engagement with a spherical surface on a member 78. It will be seen that the universal joint can shift slightly with the cam. The vertical axis of the universal joint being at an acute angle to the axis of the king pin, the brake on the outer front wheel is automatically released in rounding a corner. Eccentric members 80 provide adjustable stops for the brake shoes in their idle position.

While two illustrative embodiments have been described in detail, it is not my intention to limit the scope of the invention to those particular embodiments, or otherwise than by the terms of the appended claims. The present application is a substitute for, and renewal of, my prior application No. 10,018, filed February 18, 1925. The support of the pivot 38 or its equivalent, by a device such as spring 40, as shown in Figure 2, is claimed in my copending application No. 145,162, filed October 30, 1926.

I claim:

1. A brake for a wheel rotatably mounted on a knuckle swivelled to a front axle, comprising, in combination, a drum carried by the wheel, a plurality of floating and pivotally-connected segmental shoes within the drum, a device for expanding the shoes against the drum, an operating shaft for said device having a universal joint substantially in the axis about which the knuckle swivels, and a member carried by the knuckle and arranged to take the braking torque from the shoes in either direction of rotation of the drum, the universal joint and expanding device being free to shift slightly circumferentially of the drum to be relieved of all braking torque by said member.

2. A vehicle having a swivelled wheel with a brake, and comprising, in combination therewith, a brake-applying device swivelling with the wheel and shiftable circumferentially of the brake to center itself, a non-swivelling brake-operating shaft, and a universal joint substantially in the swivelling axis of the wheel and connecting the shaft and said device and permitting not only the swivelling of the wheel but also the shifting of said device.

3. A vehicle having a chassis frame and a swivelled wheel with a brake and comprising, in combination therewith, a brake-applying device swivelling with the wheel and shiftable circumferentially of the brake to center itself, a non-swivelling brake-operating shaft universally supported at its inner end on the frame, and a universal joint substantially in the swivelling axis of the wheel and connecting the shaft and said device and permitting not only the swivelling of the wheel but also the shifting of said device and also supporting the outer end of the shaft.

4. A vehicle having a swivelled wheel with a brake, and comprising, in combination therewith, a brake-applying device having a comparatively short shaft and swivelling with the wheel, said device and its shaft being shiftable to center themselves circumferentially of the brake about the inner end of said shaft as a center, and a non-swivelling brake-operating member universally jointed to said shaft substantially at the swivelling axis of the wheel and permitting the described shifting of said device as well as permitting the swivelling of the wheel.

5. A vehicle having a swivelled wheel with a brake, and comprising, in combination therewith, a brake-applying device swivelling with the wheel and shiftable circumferentially of the brake to center itself, and brake-applying connections operating said device and including a universal joint substantially in the swivelling axis permitting the swivelling of the wheel and also permitting the described shifting of said device.

6. A vehicle having a swivelled wheel with a brake having shoes, and comprising, in combination therewith, a brake-applying cam between the ends of the shoes and swivelling with the wheel and shiftable circumferentially of the brake to center itself, and brake-applying connections operating said cam and including a universal joint substantially in the swivelling axis permitting the swivelling of the wheel and also permitting the described shifting of said cam.

7. A brake comprising, in combination, a drum, a friction device within the drum anchoring at one end when the drum is turning in one direction and at the other end when the drum is turning in the other direction, a bracket with upper and lower arms forming a slot in its center extending circumferentially of the brake and extending part way between the ends of said device to serve as an anchor, an operating shaft extending through the slot, and a double cam on the shaft movable across the end of the bracket to expand said device, the shaft being shiftable in the slot to permit the cam to center itself.

8. A brake comprising, in combination, a drum, a friction device within the drum anchoring at one end when the drum is turning in one direction and at the other end when the drum is turning in the other direction, a bracket with upper and lower arms forming a slot in its center extending circumferentially of the brake and extending part way between the ends of said device to serve as an anchor, an operating shaft extending through the slot, and means on the shaft movable across the end of the bracket to expand said device, the shaft being shiftable in the slot to permit said means to center itself.

9. A vehicle having a swivelled wheel with a brake including a non-rotatable backing plate, and comprising, in combination therewith, a brake-applying device swivelling with the wheel and shiftable with respect to the backing plate to center itself automatically with respect to the brake, and operating connections for said device including interengaging parts, one of which operates said device and is movable with respect to the other (when the brake is applied) about a center substantially in the swivelling axis of the wheel, for the double purpose of permitting the swivelling of the wheel and of permitting the shifting of said device.

10. A vehicle having a swivelled wheel with a brake including friction means shiftable to anchor differently when the wheel is turning in opposite directions, and comprising, in combination therewith, a brake-applying device shiftable automatically with the shifting of the friction means, and operating connections for said device including interengaging parts, one of which parts operates said device and is movable with respect to the other part (when the brake is applied) about a center substantially in the swivelling axis of the wheel, for the double purpose of permitting the swivelling of the wheel and of permitting the shifting of said device.

11. A vehicle having a swivelled wheel with a brake, and comprising, in combination therewith, a brake-applying cam and camshaft swivelling with the wheel and shiftable to center the cam automatically with respect to the brake, and operating connections for said cam including interengaging parts, permitting the cam and cam shaft to shift (when the brake is applied) about a center substantially in the swivelling axis of the wheel, for the double purpose of permitting the swivelling of the wheel and of permitting the shifting of said cam.

12. A vehicle having a swivelled wheel with a brake including friction means shiftable to anchor differently when the wheel is turning in opposite directions, and comprising, in combination therewith, a brake-applying cam and camshaft shiftable automatically with the shifting of the friction means, and operating connections for said cam and camshaft including interengaging parts arranged to permit the shifting of the cam and camshaft (when the brake is applied) about a center substantially in the swivelling axis of the wheel, for the double purpose of permitting the swivelling of the wheel and of permitting the shifting of said cam.

In testimony whereof, I have hereunto signed my name.

BEN G. PARSONS.